United States Patent
Chapon et al.

(10) Patent No.: US 9,016,032 B2
(45) Date of Patent: Apr. 28, 2015

(54) ROUND BALER HAVING A WEB WRAP APPARATUS

(75) Inventors: Emmanual Chapon, Velet (FR); Pascal Gresset, Pirey (FR)

(73) Assignee: Deere & Company, Moline, IL (US)

(*) Notice: Subject to any disclaimer, the term of this patent is extended or adjusted under 35 U.S.C. 154(b) by 803 days.

(21) Appl. No.: 13/234,369

(22) Filed: Sep. 16, 2011

(65) Prior Publication Data

US 2012/0240517 A1    Sep. 27, 2012

(30) Foreign Application Priority Data

Sep. 16, 2010   (EP) .................................. 10177102

(51) Int. Cl.
 *B65B 11/00*   (2006.01)
 *A01F 15/07*   (2006.01)

(52) U.S. Cl.
 CPC ........... *A01F 15/0715* (2013.01); *A01F 15/071* (2013.01)

(58) Field of Classification Search
 CPC . A01F 15/106; A01F 15/071; A01F 15/0715; A01F 2015/076; A01F 2015/0745; A01F 2015/0755
 USPC ........ 53/203, 211, 118, 587, 588, 210, 389.2, 53/389.4, 389.5
 See application file for complete search history.

(56) References Cited

U.S. PATENT DOCUMENTS

| | | | |
|---|---|---|---|
| 7,513,088 B2 * | 4/2009 | Vande Ryse | .................... 53/118 |
| 2005/0091959 A1 | 5/2005 | Viaud et al. | |
| 2008/0098692 A1 | 5/2008 | Paillet et al. | |
| 2009/0272072 A1* | 11/2009 | Paillet et al. | .................... 53/118 |

FOREIGN PATENT DOCUMENTS

| | | |
|---|---|---|
| EP | 0432830 | 11/1990 |
| EP | 1716745 | 11/2006 |
| EP | 2113165 | 11/2009 |
| WO | 2005009112 | 2/2005 |
| WO | 2005096801 | 10/2005 |

OTHER PUBLICATIONS

European Search Report, Apr. 6, 2011, 4 pages.

* cited by examiner

*Primary Examiner* — Stephen F Gerrity
*Assistant Examiner* — Joy N Sanders (57) ABSTRACT

A round baler is provided having a web wrap apparatus with a feeder transporting web to a bale chamber. The feeder has a lower fixed carrier and an upper pivotable feeder plate. In order to assure, that the web is caught, when it is transported by baling elements into the bale chamber, the feeder is provided with at least one partially or totally elastic web sheet extending toward the bale chamber and acting on a free portion of the web.

12 Claims, 13 Drawing Sheets

ROUND BALER HAVING A WEB WRAP APPARATUS

FIELD OF THE INVENTION

This invention relates to a round baler having a web wrap apparatus with a feeder transporting web to a bale chamber, wherein the feeder has a lower fixed carrier and an upper pivotable feeder plate.

BACKGROUND OF THE INVENTION

EP 2 113 165 discloses a round baler with a so-called duckbill to feed net into a bale chamber. This duckbill has a lower fixed plate, on which rests by way of gravity an upper part, the upper part is able to pivot about an axle and has fingers pushing the net into apertures in the lower part to provide for a tight grip. The duckbill is moved into a gap between two adjacent rolls of a bale chamber to bring the net into contact with a bale revolving therein. This arrangement is problematic in that, when under bumpy conditions the duckbill is moved to the gap, while at the same time the upper plate jumps up and hits a roll. In such a situation the duckbill is susceptible to damage.

EP 432 830 discloses a round baler with a so-called duckbill to feed net into a bale chamber through a gap between two adjacent rolls covering part of a bale chamber. The duckbill leads the net between two guide plates, the lower one of which is journalled on an axle and pivots by virtue of a spring to press against the upper one. The upper guide plate is fixed and extends beyond the lower one.

Also EP 1 716 745 A1 discloses a similar duckbill, in which a resilient sheet of material is connected to the underside of the upper plate. The sheet extends beyond both plates and has fingers to prevent film or net from flipping over the leading edge of the sheet resting on top of it; instead of, the revolving crop in the bale chamber will be able to catch the flipped over part and draw the film or net into the bale chamber.

The problem this invention is based on is seen in the need to provide for a duckbill type feeder, which positively feeds web through the gap between baling elements and which also makes it easy to enter new web between the upper and the lower parts.

SUMMARY OF THE INVENTION

The use of a web sheet, which entirely or in portions thereof is elastic, will avoid a crash when the web sheet hits a baling element, like a roll, moving in a contrary direction. Such an elastic sheet may also deflect and create a pressure against a surface, which will allow clamping of web to be transported by any transportation device. As the pivotable plate is the upper one, no spring is needed to bring it in contact with the lower fixed carrier and as a result, new web may be fed between both simply by lifting the unbiased upper plate. It would still be in the scope of this invention, if the upper plate is applied by a spring slightly to avoid rattling noises or the like. A web sheet on the top of the feeder and extending beyond the normal leading edge of the feeder will be as long, almost as long, or even longer than the portion of the web being left after the cut. As a result said portion of the web will not or hardly be able to flip upwardly and rest on top of the feeder, from where it could be inserted into the bale chamber anymore, since it could not be grasped by the rotating bale. The connection to the feeder plate has the advantage, that the weight of the feeder plate is increased by the weight of the web plate, which will increase the clamping of the web in the feeder.

Since the web, after being cut, will hang down from the front of the feeder, a sheet at the bottom of the feeder will apply the web with its underside to the upper side of a device transporting the web to the bale chamber.

Elasticity in the web sheet can be provided by the material itself, like plastic, rubber, sheet metal, wood etc. in whole or in part, or by fiberglass, wires, etc. in it. Elasticity could also be achieved by a spring applying the entire web sheet or portions thereof.

When the web sheet is of a shape that follows partially the contour of baling elements covering the bale chamber and transporting the web into latter, the contact surface will be bigger and the contact between the web and the transport device may be better. Such shape may follow a circle as well as a substantially straight line.

Feed problems, especially with fibers of a net-like web may happen in certain areas only, for example at the sides. Thus, it saves resources, to have the web sheet only, where a "start aid" for the web or fibers is necessary, which usually is at the lateral end of the feeder.

By using a stripper, fibers or any other material sticking or hanging on a separating edge will be removed. The dimensions, location, the way the stripper is fixed, etc. can be selected such, that a stripping action is performed depending on the expected dirt to be removed. The stripper can be attached to the feeder fixed or moveable under a bias.

Tolerances need not be too tight, if the stripper is elastic and flexible and will flex, when it hits the separating edge, thereby staying in close contact. While plastic is preferred, sheet metal or even wood would work as well. A brush of Nylon fibers or the like working as a stripper has the advantage of being highly flexible and thus insensitive to varying dimensions, and would also have a stronger cleaning effect, since a brush consists of a multitude of strippers.

Since dirt, fibers, etc. sometimes are not easy to remove, a wiping movement in different directions may be more effective.

Manufacturing costs are kept low, if both the web sheet as well as the stripper are made as a single piece, fixed together to the feeder. This would not necessarily exclude that the web pressing and the stripping section of this single piece would have different parameters, like stiffness, thickness, friction coefficient, etc.

In round balers crop particles of brittle straw or hay and the like may escape the bale chamber and contaminate and plug surrounding areas. Using a guard covering the upper and leading side of the feeder has the advantage, that such brittle crop will not enter the path of the web and block it or moving parts, like the web sheet.

Where feeders move on uneven paths and cannot at the same time carry the guard themselves, it is helpful, when the guard is moveable and the movement depends on the movement of the feeder. Such movement may be achieved by mechanical linkages, Bowden cable, electric actuators or the like.

BRIEF DESCRIPTION OF THE DRAWINGS

The preferred embodiments of the invention are described in detail below with reference to the accompanying drawings wherein.

DESCRIPTION OF THE PREFERRED EMBODIMENT

Figure 1:
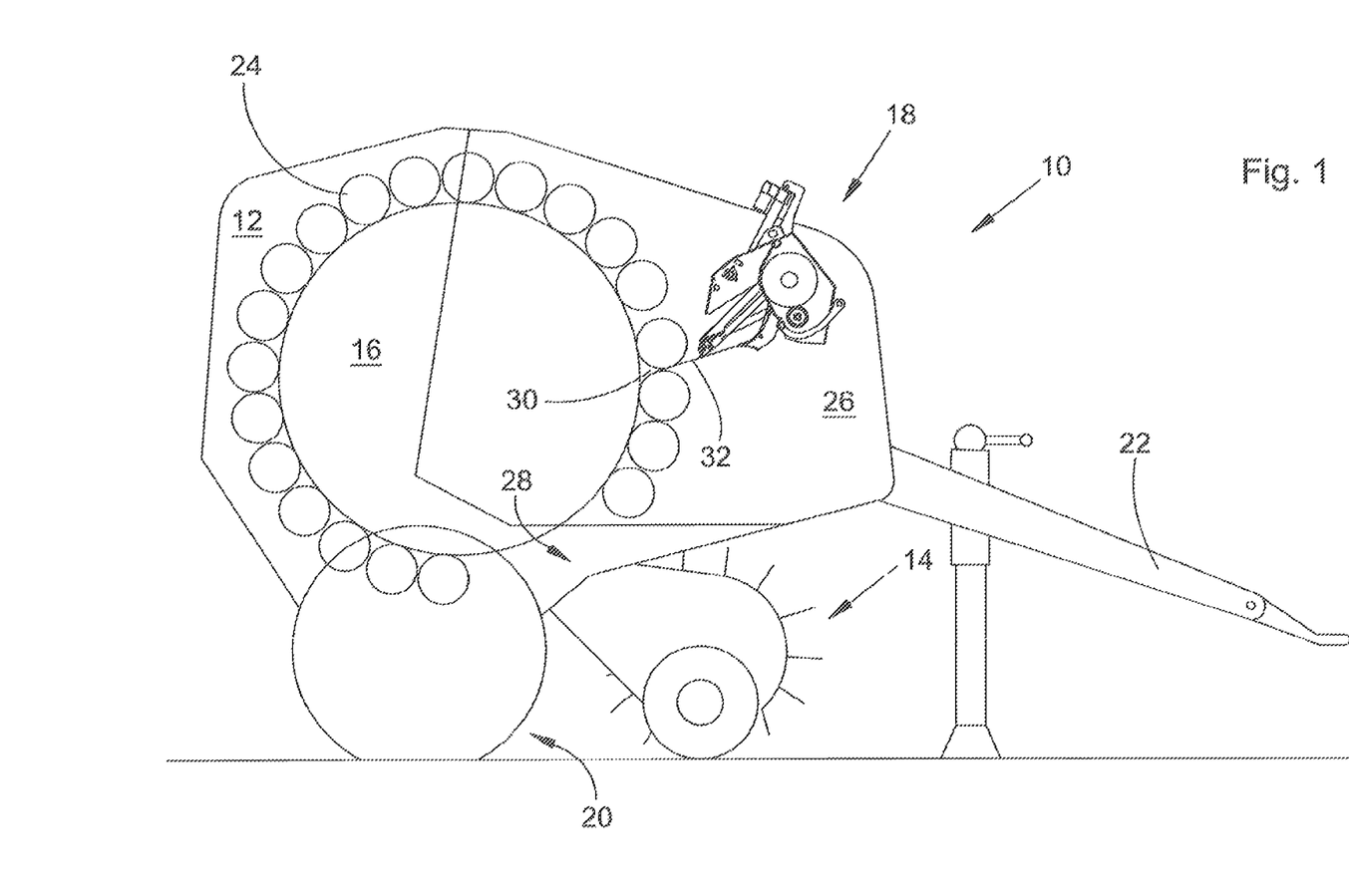
FIG. 1 is a schematic side view of a round baler provided with a web wrap apparatus.

FIG. 1 shows a round baler 10, which has a chassis 12, a pick-up 14, a bale chamber 16, a web wrap apparatus 18, an axle with wheels 20, a tongue 22 and baling elements 24.

The round baler 10, as shown, is of an ordinary fixed chamber configuration, but could also be a variable chamber configuration.

The chassis 12 rests on the axle with wheels 20, carries the pick-up 14 and can be connected to a tractor or the like by way of the tongue 22. The chassis 12 has one or multiple part side walls 26, which are spaced apart from one another to receive between them the bale chamber 16, all or part of the web wrap apparatus 18 and the baling elements 24.

The pick-up 14 picks up crop from the ground and delivers it to the bale chamber 16 through a crop inlet 28 between the baling elements 24.

The bale chamber 16 is covered substantially by the baling elements 24 on the circumference and by the side walls 26 on the face side. Beside the crop inlet 28 a gap 30 is provided between the baling elements 24, through which the web 32 may be fed into the bale chamber 16. The bale chamber 16 serves to form a cylindrical bale of hay, straw or the like, which will be covered by the web 32 of plastic, net, paper or the like. The baling elements 24 in this embodiment are in the form of steel rolls rotatably received in the sidewalls 26 and extending perpendicular to them. These baling elements 24 are arranged substantially on a circle.

Figure 2:
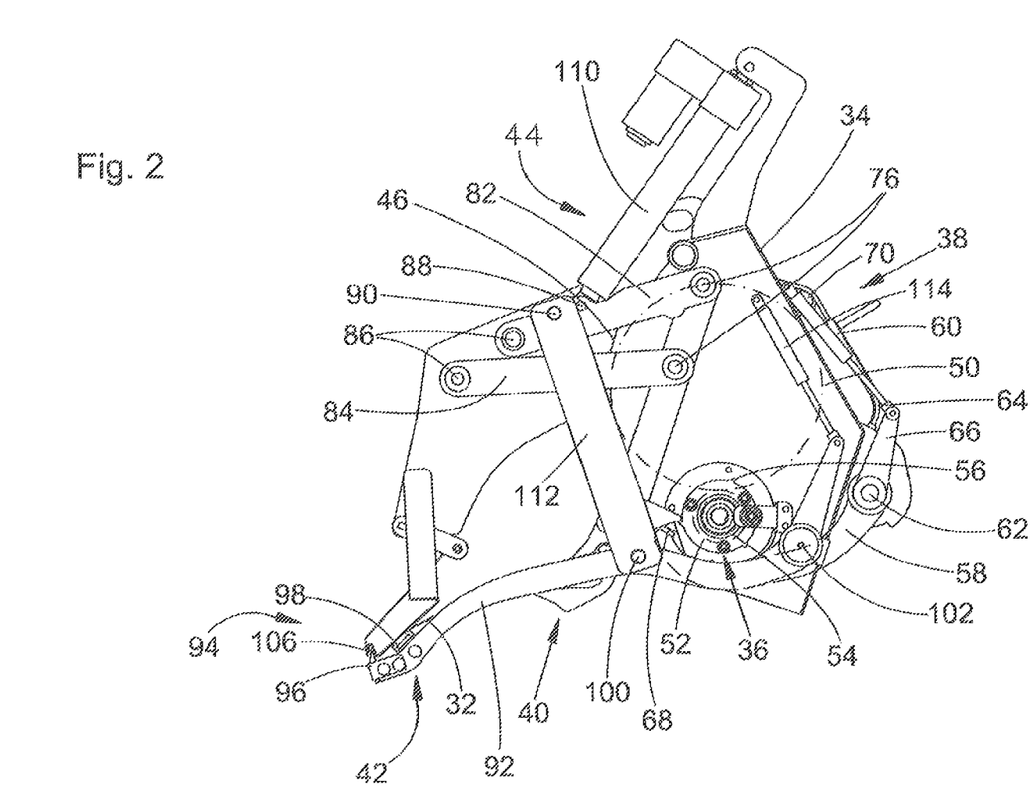
FIG. 2 is the web wrap apparatus of FIG. 1 depicted in a waiting position.

The web wrap apparatus 18 is visible in more detail in FIG. 2 and contains among other things a housing 34, a motion element 36, a brake device 38, a feeder 40, a separator 42 and an actuating mechanism 44.

The housing 34 is located in the front upper part of the round baler 10 between or substantially between the side walls 26 and has a rear wall 46 and a left and a right wall 48 connected to one another and suitable to be connected to the side walls 26. Depending on the width of the web 32, the housing 34 and the entire web wrap apparatus 18 may extend beyond the side walls 26. The rear wall 46 may be of a material or may have a layer which creates a certain friction, which will have an influence on the rolling resistance of a roll 50 of the web 32. The housing 34 may be used to attach all components and parts of the web wrap apparatus 18 to it to form an autonomous unit. The right and left walls 48 extend to the rear towards the bale chamber 16 as is needed to take up some of the parts described later.

The motion element 36 is formed by a roll 52, preferably rubber coated, which is journalled rotatably about a horizontal axis in the walls 48 and which is located such, that the roll 50 of the web 32 can rest on it. At least with one end portion the roll 52 extends beyond the walls 48 and possibly even beyond the side walls 26 and is provided with a yieldable clutch 54, which may be a slip clutch, a rubber block between a flange and the roll 52 or the like. The clutch 54 has several—in this case three—actuators 56 evenly distributed on the circumference of a disc rotating with it; however one would be sufficient. The actuators 56 may be stops, noses, or the like protruding radially, but may also be grooves or notches in the circumference. When viewing the drawing, the roll 52 has about the same diameter as the clutch 54. As is known in the art, but not shown here, the roll 52 is connected via a chain drive and a free-wheel to the baling elements 24 such, that it must rotate slower than the baling elements 24.

The brake device 38 substantially has a Control arm 58 and a brake arm 60 connected together on a shaft 62 to pivot about a horizontal axis of the latter. Also a gas spring 64 is connected to the shaft 62 via an arm 66 to assist or resist its rotational movement. It is the purpose of the brake device 38 to exert a certain pressure onto the roll 50 of the web 32 to assure a sufficient tension in it, when it is wrapped onto a bale (not shown). The shaft 62 is located at about the same height as the roll 52 and at a certain distance to it forwardly. The control arm 58 extends underneath the roll 52 to a side opposite to the shaft 62 and ends at about the center of the roll 52. The control arm 58 has an idler bar 68 or an angle extending parallel to the axis of the roll 52 between the walls 48. The brake arm 60 extends from the shaft 62 to a location above a completely wrapped roll 50 of the web 32 and has a cross element 70 designed to push onto the circumferential surface of the roll 50, thereby pressing the roll 50 against the rear wall 46 and creating the wanted rolling resistance. As is apparent from the drawing, a downward, counter-clockwise movement of the control arm 58 will provoke a counter-clockwise movement of the brake arm 60 upon the roll 50 of the web 32.

Figure 3:
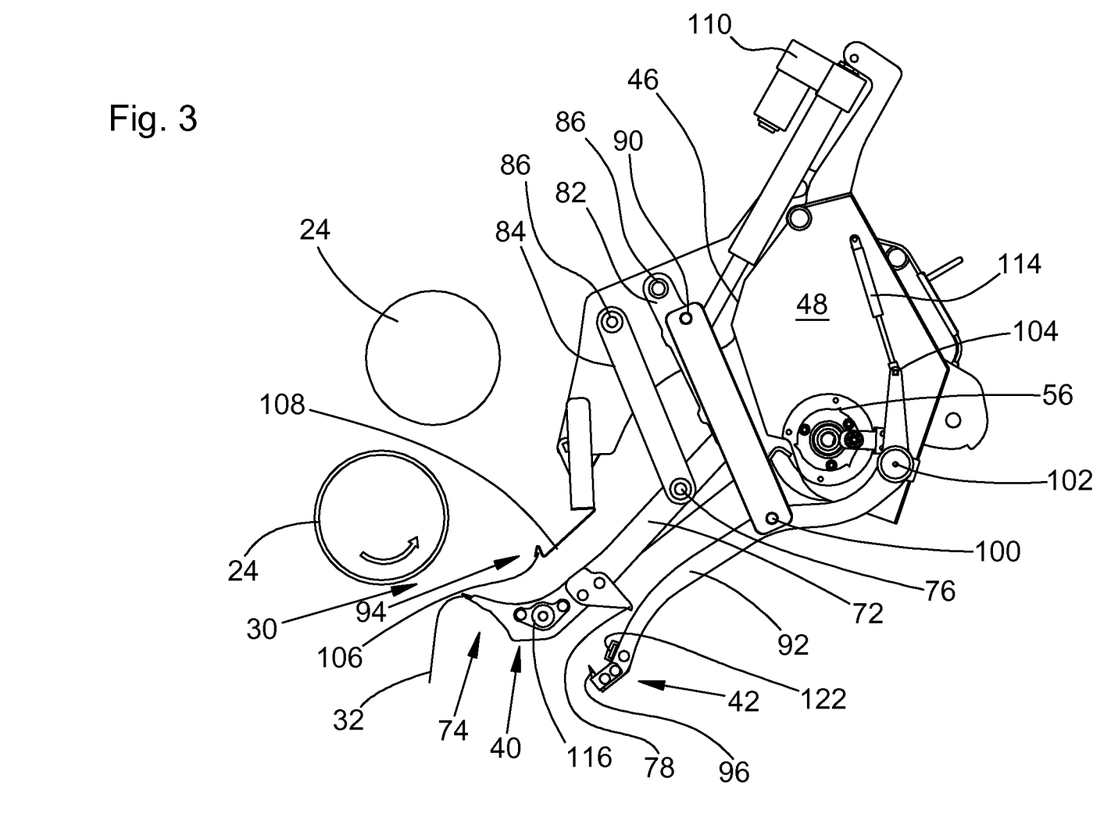
FIG. 3 is the web wrap apparatus of FIG. 1 depicted in an intermediate position.

The feeder 40 in this embodiment (see also FIG. 3) is formed as a so-called duckbill, which however is not mandatory; it could be any other moving part pulling the web 32 from the roll 50 and feeding it into the bale chamber 16 through the gap 30. The feeder 40 is composed of a strut 72 on each side holding between them a carrier 74 in the form of a mouthpiece at a lower end thereof, two vertically distant bearings 76 in an upper region and a driver 78 positioned between the carrier 74 and the lower bearing 76 at the side of the strut 72 opposite the carrier 74. The carrier 74 as such is known and has two opposite plates biased onto each other to clamp a piece of the web 32 and move it forward. An upper link 82 and a lower link 84 forming part of a parallelogram linkage are connected with one end area to the bearings 76 and with their other end areas to the bearings 86 on the walls 48 being offset horizontally as well as vertically; lines through the bearings 76 at one end and the bearings 86 at the other end do not run parallel, but divergently. The upper link 82 has an eye 88 on its upper side or a bore or the like, useful to provide a connection to another part, as well as a journal 90, which in this case, but not necessarily, is located between the eye 88 and the bearing 86. An idler element 116 is connected to and connects the struts 72 on both sides and is provided between the carrier 74 and the driver 78. As can be seen in FIG. 3 this idler element 116 assists in feeding the web 32 in a proper way into the carrier 74. The idler element 116 may consist of a simple bar or shaft.

The separator 42 has two substantially S-shaped, but almost horizontally oriented arms 92 and a counter element 94, which both serve to cut or separate a portion of the web 32 wound around a bale from a portion remaining on the roll 50. In their rear end areas, shown at the left in the drawing and facing the bale chamber 16, the arms 92 carry an upwardly oriented separating edge 96 or knife and a rubber block 122, which is oriented the same way, but provided with respect to the separating edge 96 opposite the bale chamber 16 and which forms one part of a retainer 98. A bearing 100 is located substantially in the transition area between the two curves of the "S" and is followed by a bearing 102 at about ⅔ of the remaining length of the second curve and a bearing 104 at the end of the arms 92. The counter element 94 is formed of bent sheet metal, which in this case is flexible to some extent and has a notch 106, into which the separating edge 96 may enter and a plate 108 or surface, which is positioned such, that it can be contacted by the rubber block 122, when the separator 42 is moved against it. The counter element 94 is attached to the walls 48 and located close to the gap 30. The plate 108 forms another part of the retainer 98.

The actuating mechanism 44 includes a motor 110, a link 112 and a spring 114. The motor 110, which may be actuated electrically, hydraulically or pneumatically is connected with one side to the walls 48 or any other stationary feature of the chassis 12 and with the other side to the eye 88 on the upper link 82. The link 112 is a straight rigid bar extending between and connecting the journal 90 on the upper link 82 and the bearing 100 on the arms 92. A spring 114 is formed as a gas spring, but could be of any other kind, and is connected at one end to the walls 48 and at the opposite end to the bearing 104 at the end of the arms 92.

Connected to the clutch 54 and thus to the roll 52 are three indicators rotating with the roll 52, once the web 32 is pulled from the roll 50. A sensor 140 is located close to the travel path of these indicators to sense their movement. These indicators are offset angularly with respect to the actuators 56.

Figure 7:
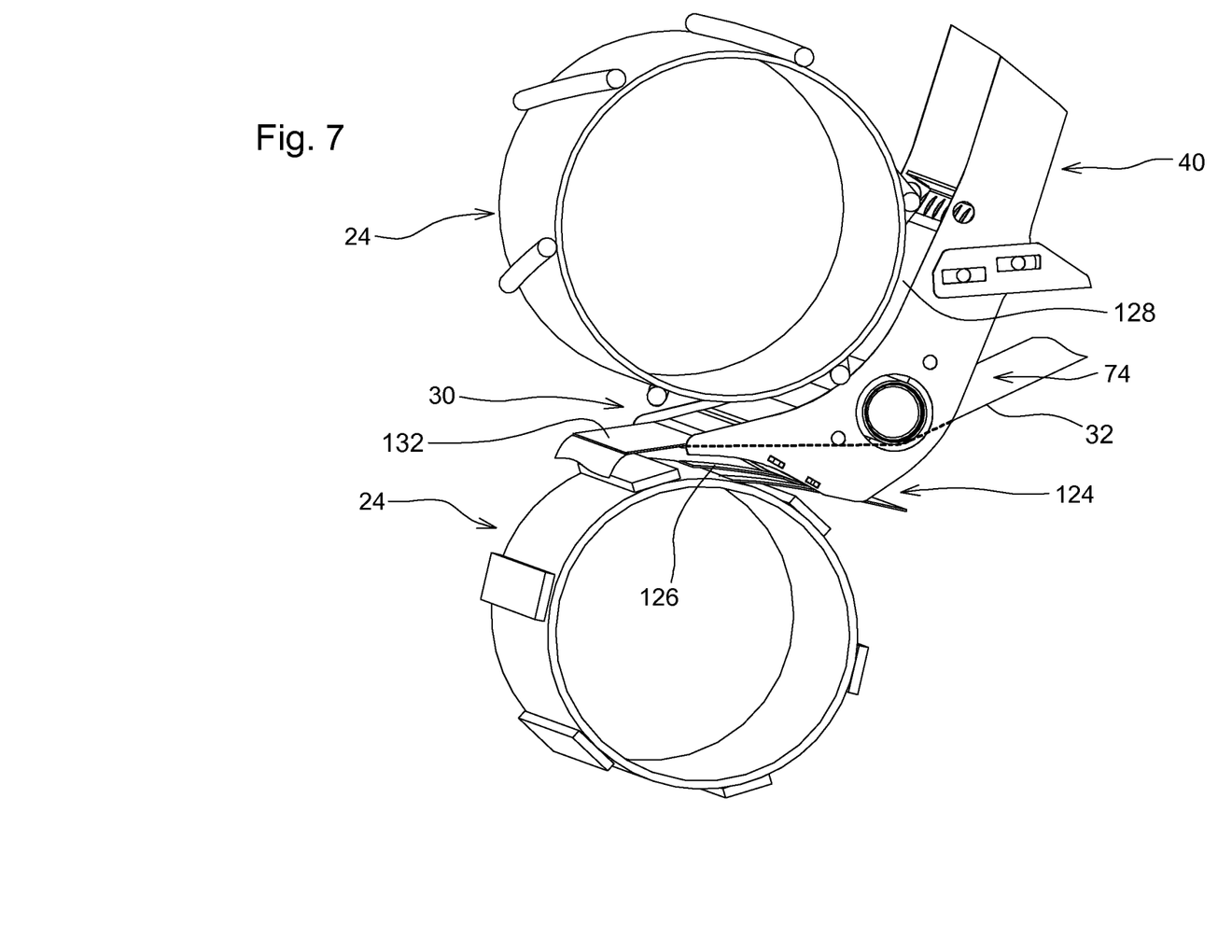
FIG. 7 is the baling elements of the round baler of FIG. 1 with a feeder in a feeding position.
Figure 8:
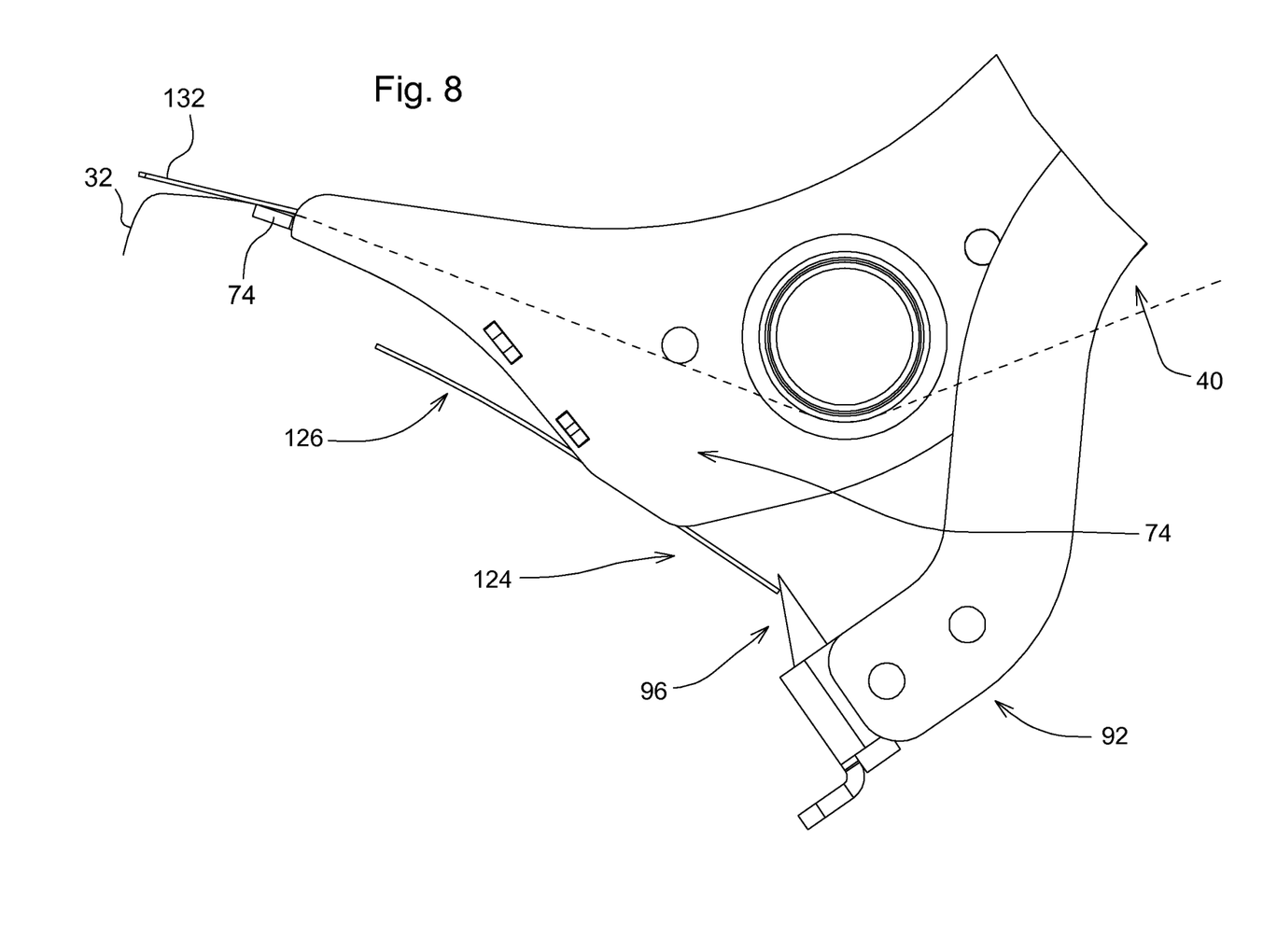
FIG. 8 is a leading portion of the feeder with a stripper and web sheets shown in side view.

FIG. 7 is a more detailed view of the leading part of the feeder 40 and of two baling elements 24 receiving the feeder 40 between them. At the underside of the carrier 74 is provided a stripper 124. The stripper 124 (see FIG. 8) is formed as a thin and flat piece of plastic, rubber, sheet metal or wood and bolted, glued, riveted, snapped or otherwise fastened to the carrier 74. The stripper 124 extends from the lower edge of the carrier 74 forward at a length, which is sufficient to reach the separating edge 96, when the feeder 40 and the separator 42 are moved relative to one another, as is shown in FIG. 8. The length of the stripper 124 is chosen such, that it not only touches the tip of the separating edge 96, but strips along a slanted surface terminating in the tip. As is apparent from the drawing, the stripper 124 will also strip along the opposite side of the separating edge, when the feeder 40 moves from its position in FIG. 2 to that of FIG. 3.

Figure 9:
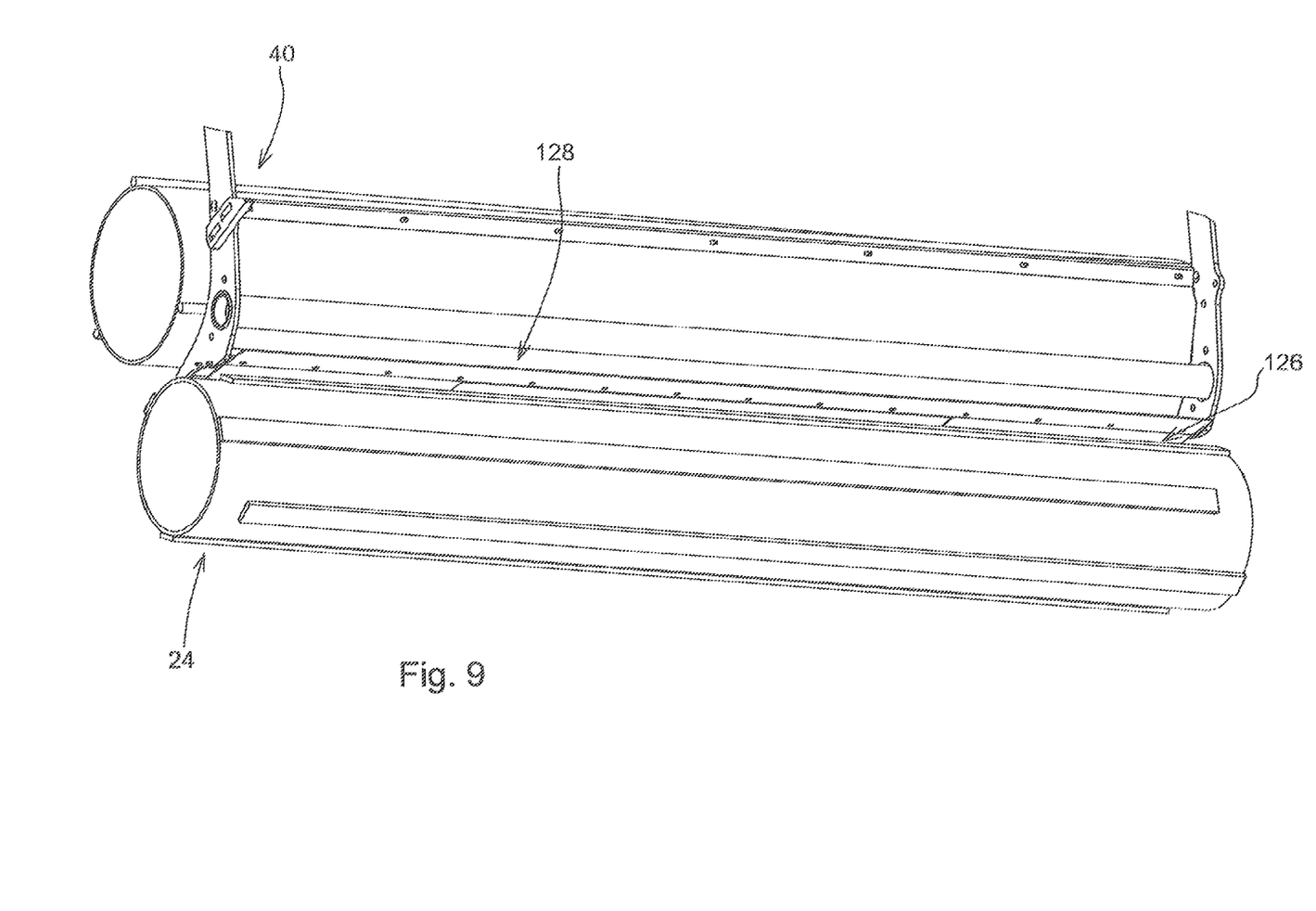
FIG. 9 is the feeder in a gap between baling elements in a perspective front view.

FIGS. 7 and 8 also show a web sheet 126 at the bottom side of the carrier 74. This web sheet 126 extends in the opposite direction compared with the stripper 124. The web sheet 126 is elastic and extends towards the leading edge of the feeder 40, i.e. to the rear, when the web wrap apparatus 18 is installed in the round baler 10. The free end zone of the web sheet 126 may be bent slightly away from the carrier 74 to follow the circumference of a baling element 24 underneath of it. The web sheet 126 in this embodiment does not extend over the full width of the feeder 40 and the baling elements 24, but over areas of 20% each starting from the lateral end, see FIGS. 7 and 9. However, it could be more or less. The web sheet 126 is attached and dimensioned such, that it will rest on the baling elements 24 underneath, the upper side of which is rotating towards the bale chamber 16. When abutting the baling element 24 it will exert some pressure on it. It is the purpose of this web sheet 126 to bring any web 32 or fibers of it hanging down from the feeder 40 into close contact with the baling element 24 to assure its transport into the bale chamber 16, where it will be caught by the bale and drawn in. In fact, the fibers or the web 32 will be pressed between the web sheet 126 and the baling element 24. Without the web sheet 126 especially fibers may simply slide on the baling element 24 without getting caught and thus the wrapping will be delayed or may not start at all. Especially in the side area the web 32 may tear and end in individual fibers rather than in a uniformly cut edge.

Figure 10:
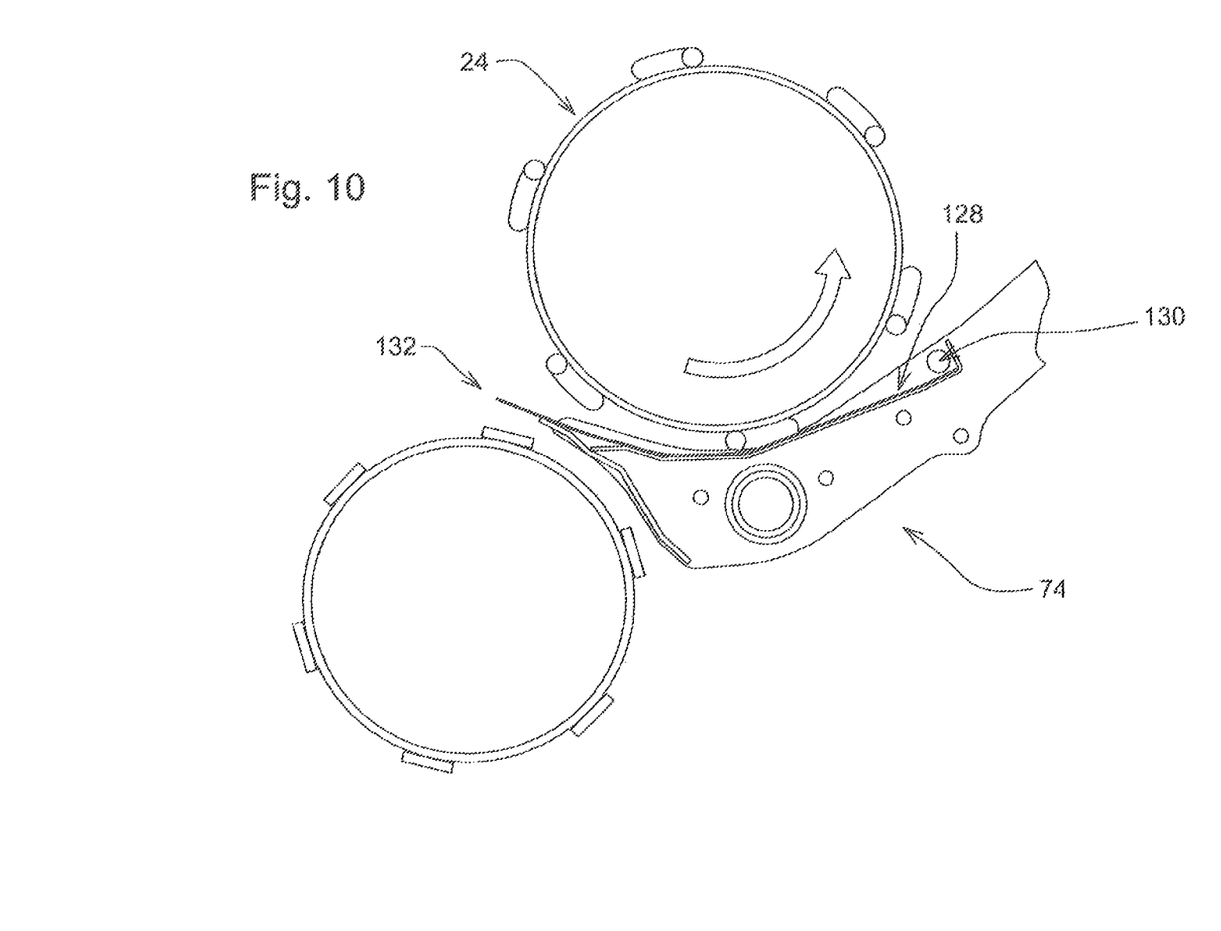
FIG. 10 is the feeder between two baling elements with a top web sheet in more detail.

In FIG. 10 is shown again the carrier 74 with a feeder plate 128 located on top of the carrier 74 and being able to pivot upwardly about an axle 130. The feeder plate 128 and the associated portion of the carrier 74 are formed as disclosed in EP 2 113 165. The feeder plate 128 is made of strong sheet metal. Attached to the upper side of the feeder plate 128 is a web sheet 132 of rubber or plastic, i.e. very flexible and elastic; it could be attached to the underside of it as well. The web sheet 132 extends straight beyond the end (at the left in FIG. 10) of the carrier 74. The feeder plate 128 together with the web sheet 132 rests on the carrier 74 due to gravity forces and clamps the web 32 therebetween. The web sheet 132 is bolted, glued, riveted or otherwise fixed on top of the feeder plate 128 and is flexible enough to withstand an accidental contact with the baling elements 24 moving in a direction opposite to the direction of the feeder 40, when it delivers the web 32 into the gap 30.

Figure 11:
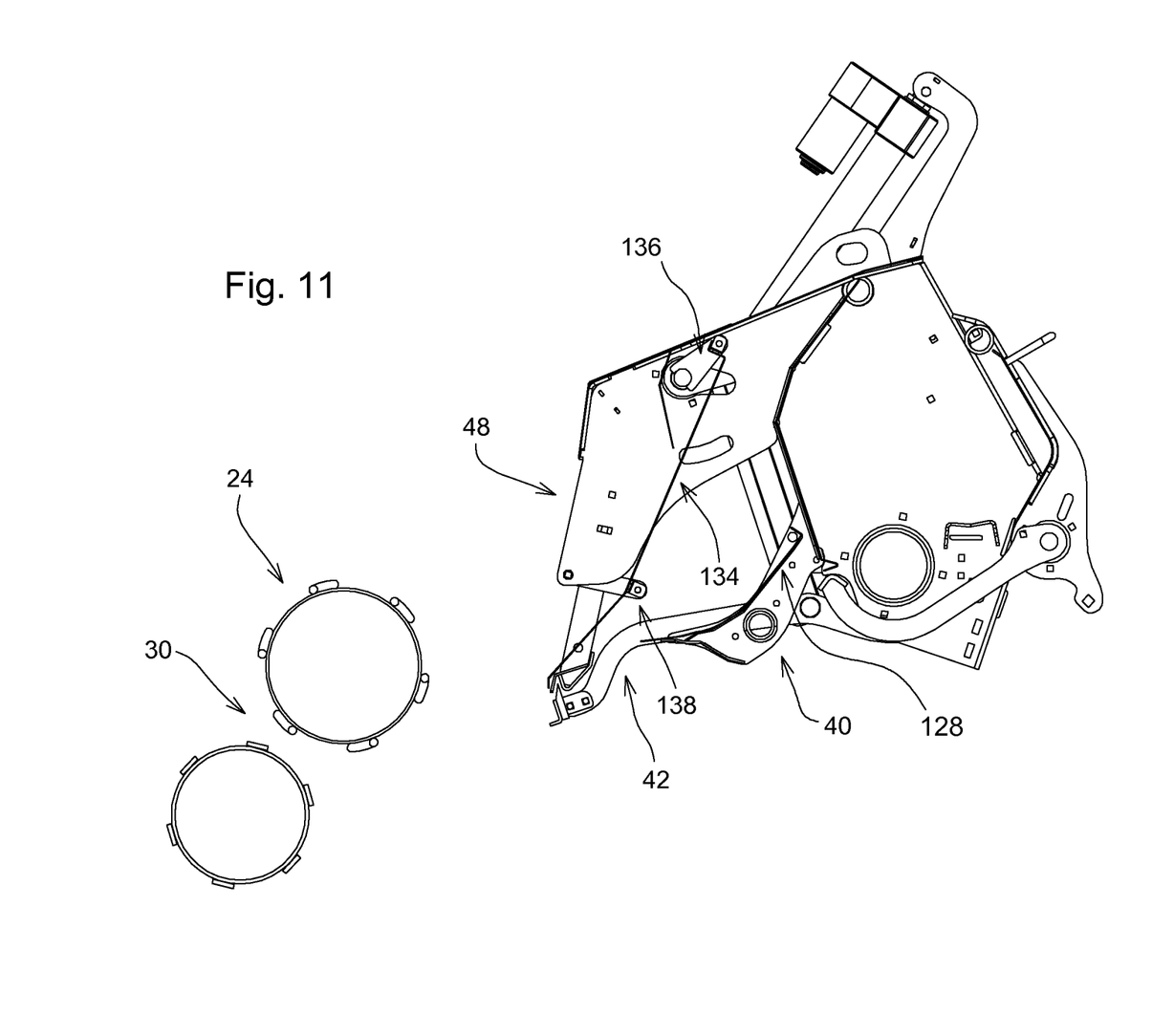
FIG. 11 is the web wrap apparatus with a guard in side view with the feeder in a home position.
Figure 12:
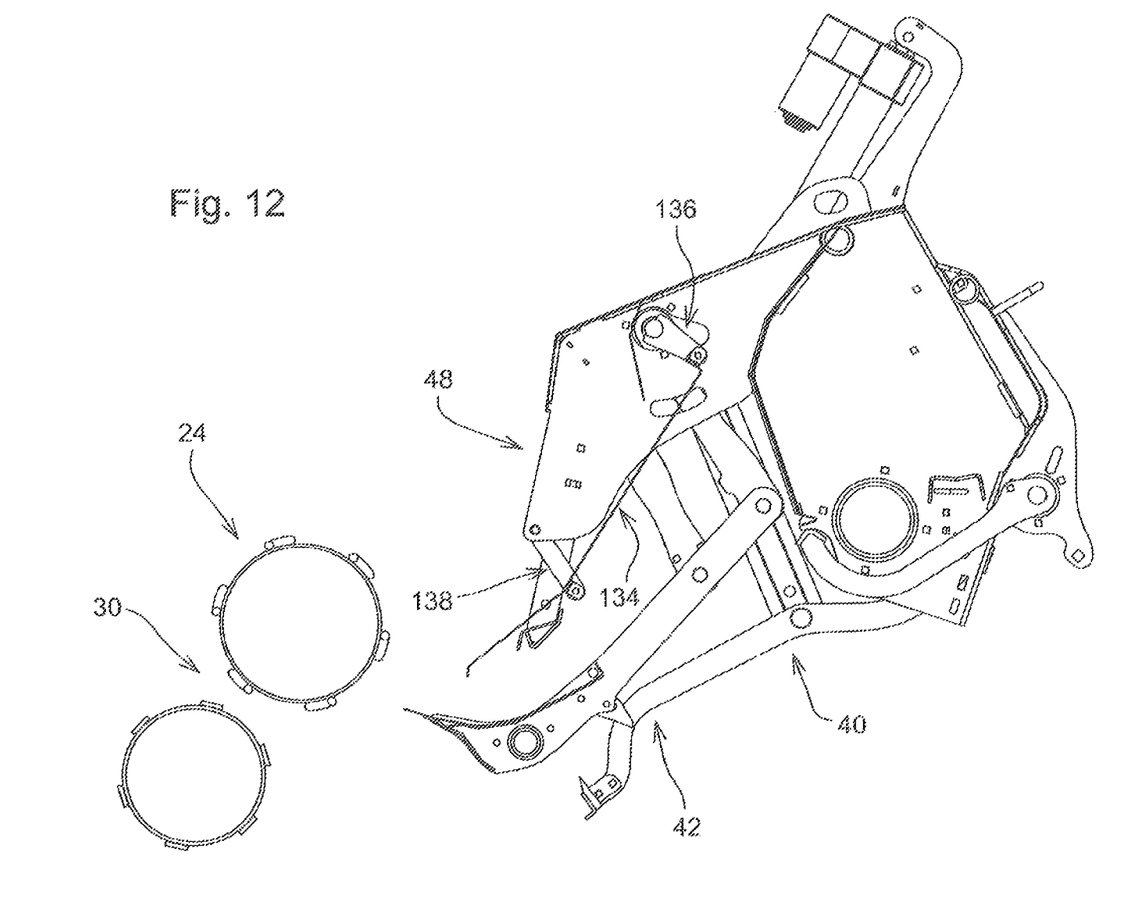
FIG. 12 is the web apparatus of FIG. 11 with the feeder in an intermediate position; and, FIG. 13 is the web apparatus of FIG. 11 with the feeder in a feeding position between baling elements.
Figure 13:
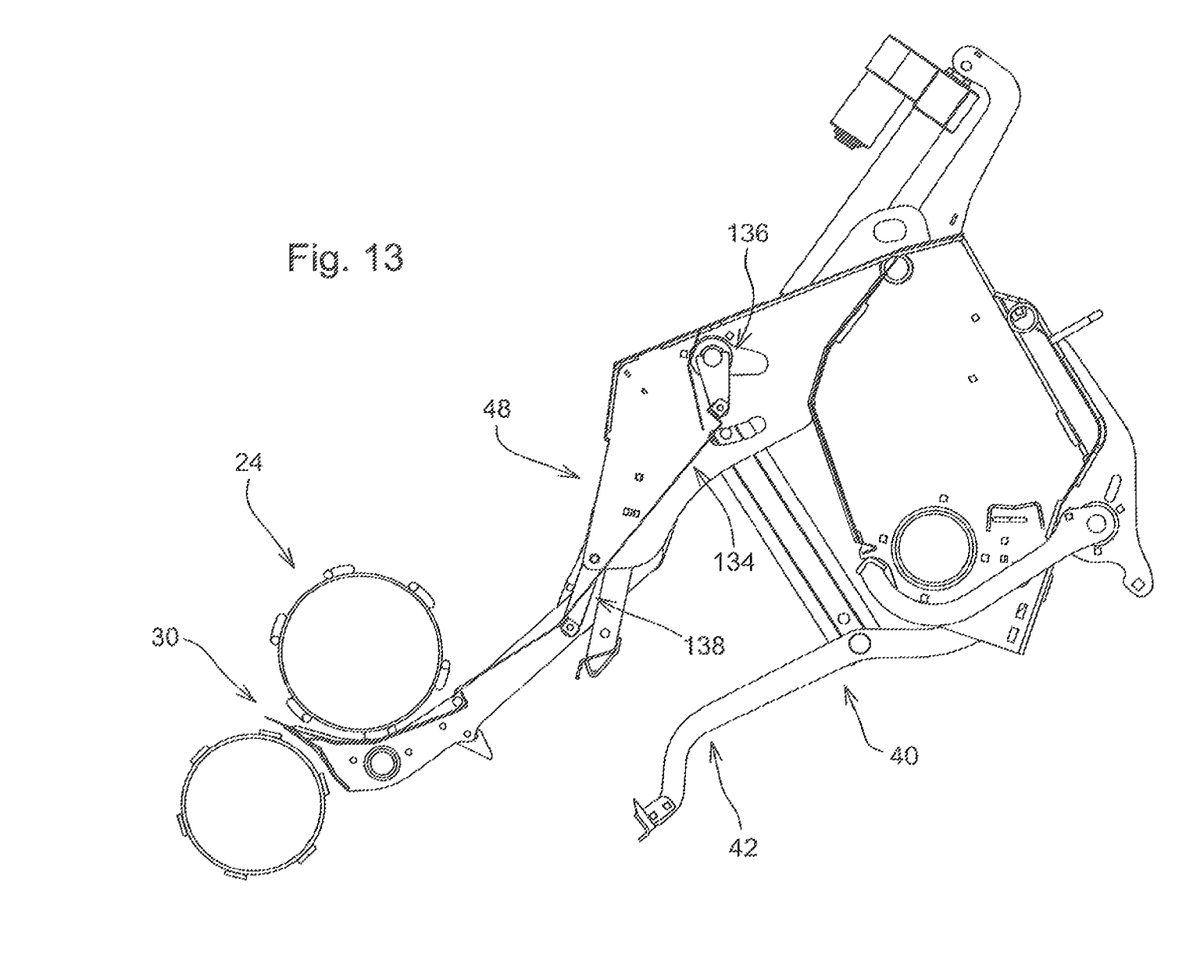

According to FIGS. 11 to 13 a guard 134 is provided. The guard 134 is moveably attached to the walls 48 of the web wrap apparatus 18 by way of a first, front lever 136 and a second, rear lever 138. These levers 136, 138 form a parallelogram and are connected at one end pivotally to the guard 134. At the other end each lever 136, rotates with the upper link 82, i.e. with the feeder 40 and thus follows its movement. The guard 134 is formed of sheet metal pivotally carried with an upper, front end portion to the lever 136 and at about two thirds of his length to the rear lever 138. The last third extends in a cantilever fashion above the separator 42 and depending on its position above the feeder 40. Considering, that brittle crop escapes from the bale chamber 16 from the right to the left in FIGS. 11 to 13 this guard 134 prevents crop from building up on the feeder 40 and the separating edge 96 and thus their operation remains unaffected.

Based on this structural description the function is described as follows starting from a state shown in FIG. 2, in which the web wrap apparatus 18 waits to be operated. In a state as shown in FIG. 2, the roll 50 with the web 32 is placed on the roll 52 and is secured in its position between the cross element 70 and the rear wall 46. The arms 92 rest against the counter element 94 and the feeder 40 is in a position remote from the gap 30. The web 32 extends from the roll 50, underneath the roll 52 over the idler bar 68, through the carrier 74 to a location between the separating edge 96 and the notch 106, wherein it is clamped between the plate 108 and the rubber block 122 at a place slightly upstream of it. The driver 78 rests against the actuator 56 to keep the roll 52 from rotating.

Figure 4:
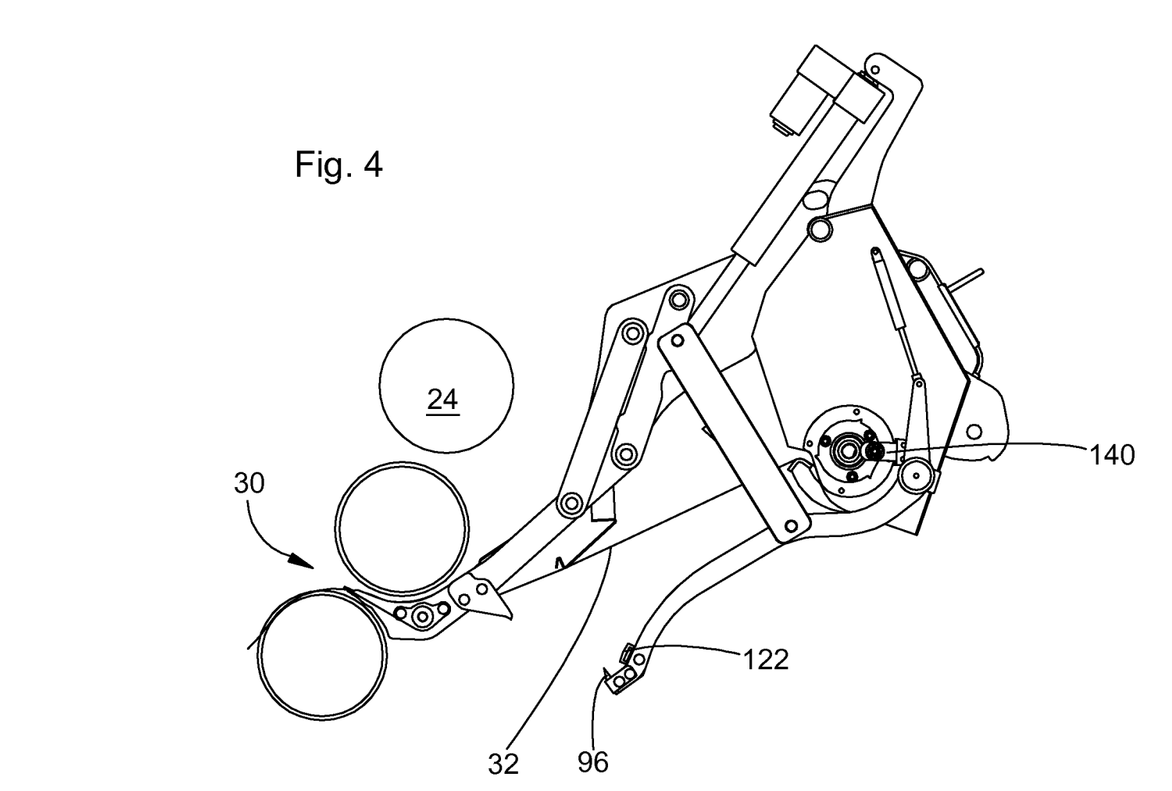
FIG. 4 is the web wrap apparatus of FIG. 1 depicted in a feeding position.
Figure 5:
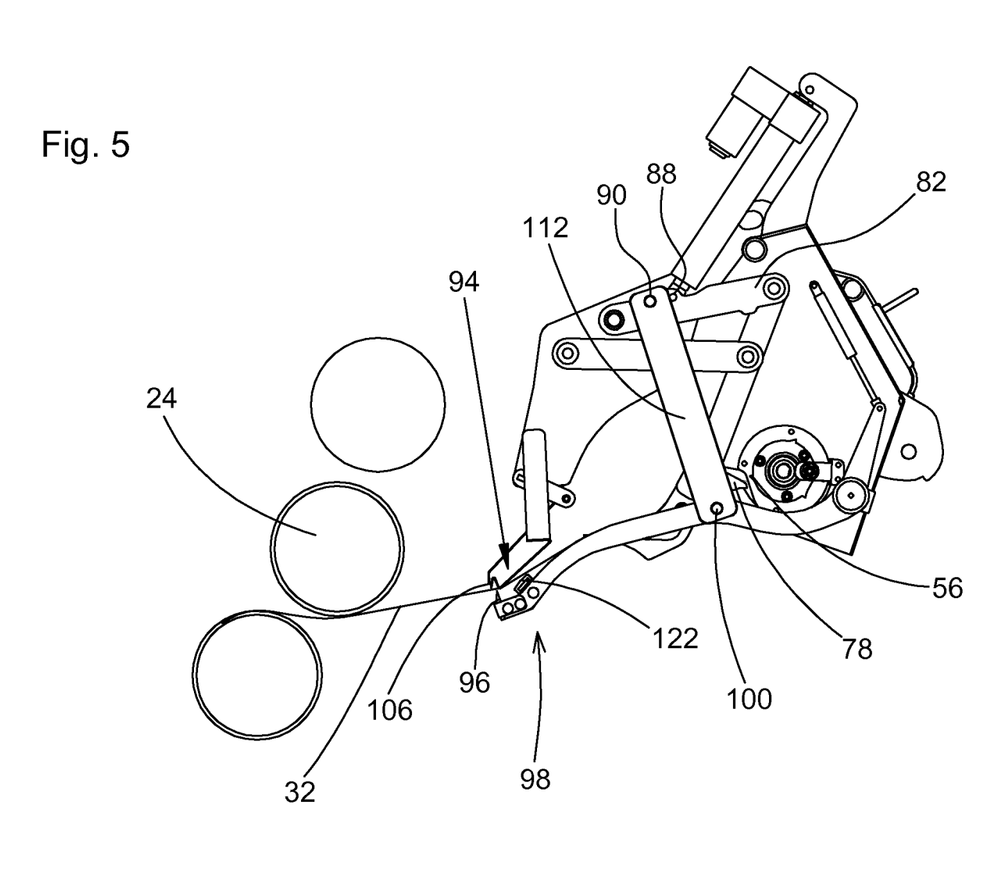
FIG. 5 is the web wrap apparatus of FIG. 1 depicted in a partly retracted position.
Figure 6:
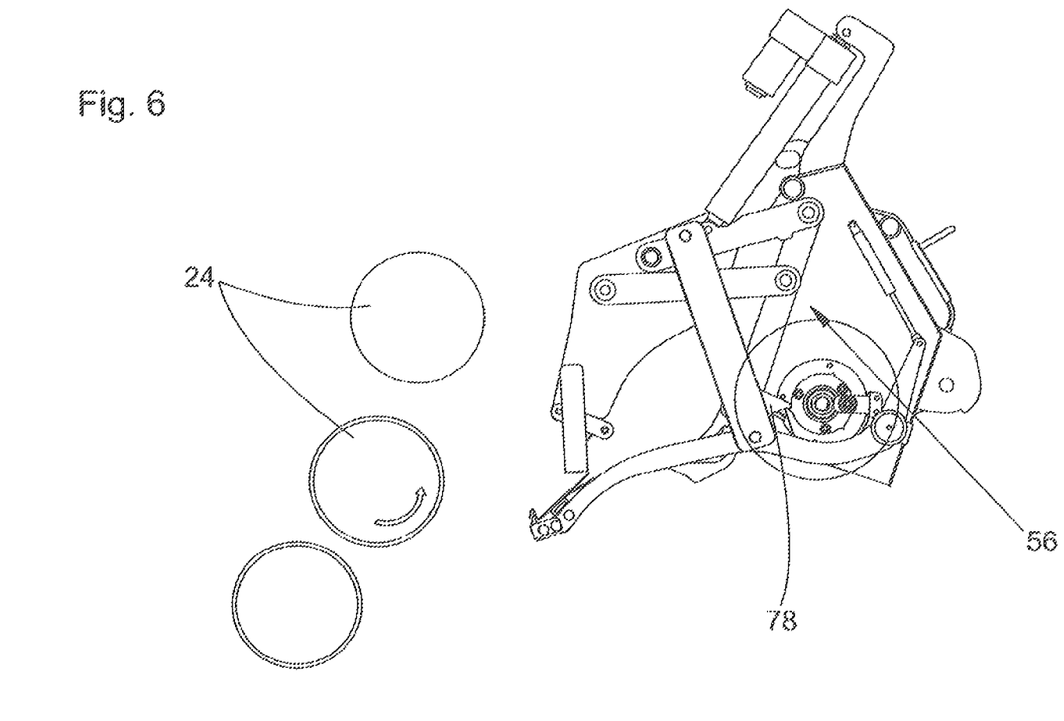
FIG. 6 is the web wrap apparatus of FIG. 1 depicted in a fully retracted position.

As soon as a manual or electrical signal is given to the actuating mechanism 44 to initiate wrapping the web 32 around a bale, the motor 110 is extended, thereby moving the arms 92 away from the counter element 94, moving the feeder 40 downward and towards the gap 30, which releases the driver 78 from the actuator 56. FIG. 3 shows, that the separator 42 moves away sufficiently to allow the feeder 40 to enter the gap 30. Once the carrier 74 protrudes the gap 30, the web portion hanging down from the carrier 74 is caught by the rotating bale and pulled from the roll 50. Tension is created in the web 32, since the roll 50 experiences friction on the wall 46 and since the roll 52 is hindered from free movement. According to FIG. 4 the web 32 is inserted into the gap 30 and caught by the rotating bale. FIG. 5 shows a situation, in which the motor 110 is retracted and thereby the feeder 40 is on its way back to a resting position and the driver 78 approaches the actuator 56. The dimensions, locations and arrangements of the feeder 40 and the separator 42 are chosen such, that in the situation of FIG. 5, shortly before the web 32 is separated, the web 32 is pulled over the rubber block 122 at one side and over the counter element 94 on its other side, but not or hardly over the tip of the separating edge 96. This helps to avoid unnecessary wear on the separating edge 96, premature tearing of the web 32 and thus achieves a clean cut or separation of the web 32. As a next step the driver 78 engages the actuator 56, which rotates together with the roll 52. As a result the link 112 is abruptly kicked upwardly, which assists the upward movement of the arms 92 initiated by the motor 110, and the spring 114. In order to dampen the shock on the roll 52 either the clutch 54 allows a slipping movement or if the clutch 54 contains rubber blocks or the like, the driver 78 will be accelerated by the first compressed and then expanding rubber. As a further consequence, and as is shown in FIG. 6, the accelerated separating edge 96 presses the web 32 into the notch 106 and clamps it as well between rubber block 122 and the plate 108, which increases tension in the web portion connected to the bale and finally leads to its separation. The piece of the web 32 extending from the separating edge 96 to the carrier 74 is the one hanging down, when wrapping starts again.

Having described the preferred embodiment, it will become apparent that various modifications can be made without departing from the scope of the invention as defined in the accompanying claims.

The invention claimed is:

1. A round baler having a web wrap apparatus with a feeder transporting web to a bale chamber, the feeder having a lower fixed carrier and an upper pivotable feeder plate located on top of and pivotally attached to the lower fixed carrier, the web passing between the upper pivotable feeder plate and the lower fixed carrier, wherein the feeder is provided with at least one of a partially and totally elastic web sheet extending toward the bale chamber and acting on a free portion of the web, the web sheet is at least one of coupled to the bottom side of the lower fixed carrier and coupled to the upper side of the upper pivotable feeder plate, extending beyond the lower fixed carrier.

2. A round baler according to claim 1, wherein the web sheet is elastic.

3. A round baler according to claim 1, wherein the web sheet is of a shape partially following the contour of baling elements covering the bale chamber.

4. A round baler according to claim 1, wherein the web sheet does not extend over the full width of the feeder.

5. A round baler according to claim 1, wherein a stripper is attached to the bottom side of the lower fixed carrier such that it strips a surface of a separating edge of a separator during a relative movement between the feeder and the separator.

6. A round baler according to claim 5, wherein the stripper is formed as an elastic sheet.

7. A round baler according to claim 5, wherein the web sheet and the stripper are made as a single piece.

8. A round baler according to claim 5, wherein a guard is provided covering a portion of at least one of the feeder and the separator.

9. A round baler according to claim 8, wherein the guard is moveable, whereas the movement depends on the movement of the feeder.

10. A round baler according to claim 1, wherein the web sheet further comprises a first web sheet attached to the bottom side of the lower fixed carrier and a second web sheet attached to the upper side of the upper pivotable feeder plate, extending beyond the lower fixed carrier.

11. A round baler according to claim 10, wherein the first web sheet bends away from the fixed lower carrier.

12. A round baler according to claim 10, wherein the first and second web sheets are spaced apart.

* * * * *